Oct. 13, 1942.    R. S. DRUMMOND    2,298,471
GEAR FINISHING
Filed May 9, 1939    2 Sheets-Sheet 1

INVENTOR.
ROBERT S. DRUMMOND
BY
Whittemore, Hulbert & *J. Shemp*
ATTORNEYS

INVENTOR.
ROBERT S. DRUMMOND

Patented Oct. 13, 1942

2,298,471

UNITED STATES PATENT OFFICE 2,298,471

GEAR FINISHING

Robert S. Drummond, Detroit, Mich.

Application May 9, 1939, Serial No. 272,673

7 Claims. (Cl. 29—103)

The present invention relates to gear finishing and more particularly to a tool adapted to be employed in crowning of gears. This application is a continuation in part of my co-pending application, Serial No. 90,401, filed June 13, 1936, entitled "Machine for cutting gears," now Patent 2,157,981, issued May 9, 1939.

The present invention relates to a gear finishing tool which is in the form of one or more gear-like members having teeth provided with cutting surfaces on both sides thereof. A portion of the cutter or tool is characterized by having teeth the opposite sides of which extend at different leads. As a result of this, as will be evident, the teeth are tapered from end to end, and correspondingly the tooth space is tapered from end to end. In like manner opposite sides of the teeth of the gear finishing tool are formed with different pressure angles.

The tool as described above may be employed alone or with a similar but oppositely arranged co-axial tool. If preferred, the composite tool may be made up of an intermediate tool having uniform teeth provided with two oppositely arranged co-axial cutters having the non-uniform characteristics referred to above.

It is accordingly an object of the present invention to provide a cutter in the form of a gear-like member having teeth, the opposite sides of which extend at different helix angles.

It is a further object of the present invention to provide a gear-like cutting tool having teeth the opposite sides of which have different pressure angles.

It is a further object of the present invention to provide a gear-like cutter having teeth, the opposite sides of which extend at different leads and which have different pressure angles.

It is a further object of the present invention to provide a gear cutter made up of two co-axial oppositely arranged non-uniform cutters of the type referred to above.

It is a further object of the present invention to provide a composite gear cutting tool made up of an intermediate gear-like cutter having uniform teeth and a pair of oppositely arranged co-axial cutters having teeth which are tapered in the direction of the central uniform cutter.

Other objects of the invention will be apparent as the description proceeds, and when taken in conjunction with the accompanying drawings, wherein.

Figure 1:
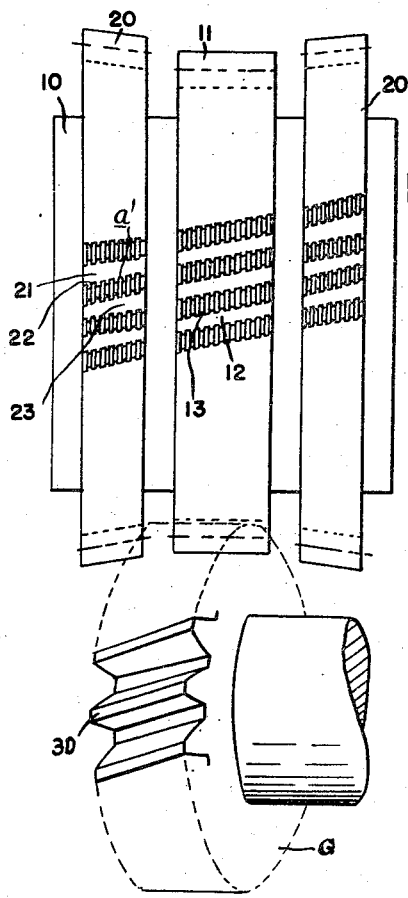
Figure 1 is an elevation of a composite cutter associated with a gear illustrating my present invention.

The gear cutter which forms the subject matter of the present invention is of the type provided with teeth having cutting surfaces on both sides thereof. The cutter and gear to be finished are run in mesh, one of the parts being rotated directly and the other through the intermeshing engagement of the parts.

Machines for finishing gears according to this method are disclosed in my co-pending application, Serial No. 3,662, filed January 26, 1935, entitled "Machine for cutting gears." According to the present invention the gears may be crowned by substituting a tool as disclosed in the present application for the conventional cutter suggested in the co-pending application referred to. Crowning may take place, due to relative translation between the tool and gear, the translation being limited to a plane parallel to the axes of both gear and cutter. The crowning action may, if preferred, result from relative motion between the parts, such as would result from moving the gear in a curved path so as to move progressively toward and away from the cutter. The crowning action may be obtained by a relative rocking movement of the gear and cutter so as to bring the ends of the gear teeth into engagement with the end-cutting portions of the tool. The crowning action may, if preferred, result from a combination of the above described movements: for example, as a relative translation parallel to the axes of both gear and cutter accompanied by a simultaneous timed relative tilting of the axes. Furthermore, employing the present tool, a crowning effect may be obtained either with the axes of the gear and cutter crossed or parallel, Referring particularly to Figure 1, the cutter comprises a support 10 which may be in the form of a shaft adapted to be supported between centers. A central cutting element 11 in the form of a gear having teeth 12 provided with serrations 13 is fixedly carried on the support 10. The teeth 12 are preferably uniform from end to end as to lead or helix angle and pressure angle.

End-cutting cutting elements 20 are in the form of gears provided with teeth 21, which in turn have serrations 22 formed therein. The serrations 22 and 13 previously referred to, provide cutting edges which are adapted to remove metal from the faces of the gear teeth, due to relative slippage therebetween. In the event that the tool is employed at crossed axes with the gear, this relative slippage results from two independent motions: one, the normal sliding action, between gear teeth; and the other, a cross sliding action introduced by the crossed axes setting.

The teeth 21 are tapered from end to end as indicated in Figure 1, the small end of the teeth being arranged adjacent the central cutter 11. As a result of this, correspondingly tapered tooth spaces 23 are provided having their widest end adjacent the central cutter 11. As will be evident when a gear in mesh with the central cutter 11 is brought into cutting relation with either or both of the end cutters 20, the ends of the gear teeth will be chamfered or crowned. If the gear being finished is reciprocated in a plane parallel to the axis of the cutter so that the ends of its teeth engage the teeth 21, it will be evident that the ends of the teeth will be chamfered. If, on the other hand, the engagement between the ends on the gear teeth result from a relative tilting of the axes either with or without translation, it will be evident that the ends of the teeth will be more nearly rounded to result in a true crowning effect as opposed to a chamfered effect.

It has been found that when the ends of gear teeth are chamfered or crowned as suggested above, the profile of the teeth is altered from the involute produced by the normal cutter at center. This is readily explained due to the fact that when crossed axes are employed, cutting action takes place along a band which extends diagonally up and down the tooth face. It has been found that a gear which is crowned by this action will have plus curves at diagonally opposite corners and minus at the other corners.

The result of this is that as the gear is used in subsequent operations the bearing under various conditions does not extend up and down the teeth generally in the plane of rotation. Under certain circumstances this is a serious objection.

According to the present invention, the aforementioned difficulty may readily be overcome by providing different pressure angles on opposite sides of the teeth 21 of the cutter 20.

Figure 7:
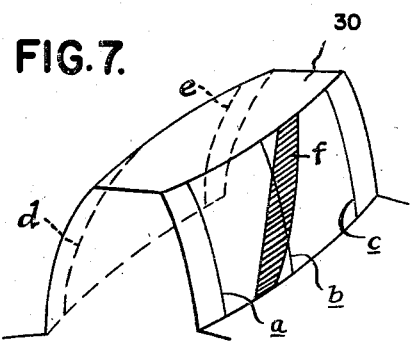
Figure 7 is a perspective of a gear tooth finished according to the present invention.
Figure 8:
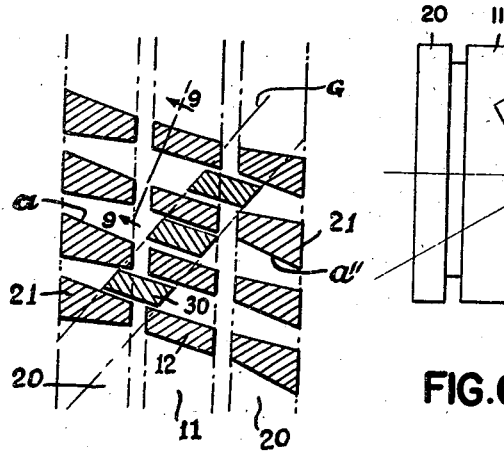
Figure 8 is a diagrammatic section illustrating operating conditions at the zone of mesh.
Figures 6, 9:
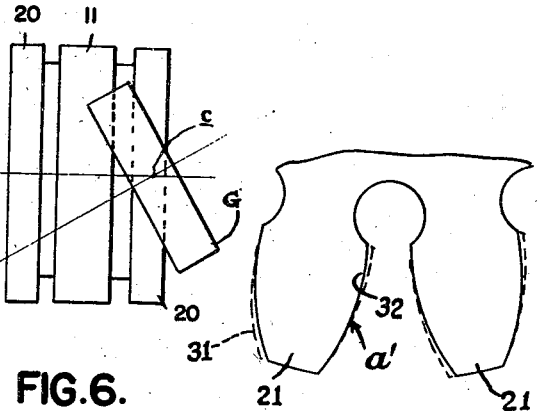
Figure 6 is a diagrammatic illustration showing the relationship of gear and cutter under an alternative condition.
Figure 9 is a diagrammatic end elevation illustrating the pressure angle modification.

I have illustrated in Figures 7, 8 and 9 the considerations which govern the modifications introduced to the cutting tool.

Figure 7 is a diagrammatic view of a gear tooth and may be regarded as a tooth 30 of the gear G shown in Figure 1. The tooth 30, as shown in Figure 1, is a left-hand helix. If the gear G is crowned by reciprocating the same axially while in mesh with the composite cutter illustrated so that the ends of the tooth 30 are operated on by the end cutters 20, the tooth will have its ends of reduced thickness and will be relatively thick in the center. This is true no matter what relative crowning motion is employed. Thus for example the crowning motion may be straight reciprocation of the gear G or the crowning may result from a relative rocking motion between the two parts. If the teeth 21 of the end cutter 20 are unmodified except as to lead, certain errors will be introduced into the crowned gear teeth 30.

Reciprocation of the gear G in an axial direction, or in some other direction, in a plane parallel to the axis of both the gear G and composite tool, will cause the teeth 12 of the center cutter 11 to machine the faces of the teeth 30 uniformly at the desired lead. However, the tapered teeth 21 of the end cutter present an off-lead condition. In other words the tooth surfaces are off-lead with respect to the tooth surfaces of the gear G in a direction to machine the surfaces of the teeth 30 adjacent the corners thereof.

Under the conditions outlined above, the band of contact generated on the surface of the teeth 30 by the teeth of the composite cutter will extend as indicated by the shaded area $f$, that is, from the bottom of the teeth upwardly and to the right as seen in Figure 7. This band of contact slopes upwardly and away from each acute angle corner of the gear tooth.

So far it has been assumed that the teeth 21 of the cutter 20 are unmodified except as to lead. If now the tooth 30 is checked as to involute along the paths $a$, $b$, $c$, $d$, and $e$, it will be found that involute or pressure angle errors have been introduced into the tooth profiles. Along the path $b$, that is centrally of the tooth 30, the involute will be found to be substantially correct. Along the path $a$ the involute will be found to be low at the top, a condition which is referred to herein as minus involute or increased pressure angle. Correspondingly, the involute along the path $c$ will be found to be high at the top, a plus involute or reduced pressure angle condition. At the opposite side of the tooth, along the path $d$, conditions will be the same as along the path $c$, and in like manner the involute as checked along the path $e$ will correspond to the condition of pressure angle as measured along the path $a$. In other words, along the diagonally opposite corners of the gear tooth 30, the same conditions exist.

In Figure 8 I have illustrated diagrammatically the relationship between the teeth 30 of the gear and the teeth 21 and 12 of the cutters. This figure may be considered as a developed section of both the gear and the cutter looking downwardly in Figure 1. The outlines of the end surfaces of the cutter sections 20 and 11 are indicated in dotted lines, and the outline of the gear G is indicated in full lines.

The surfaces of the teeth 30, on which the paths $a$, $b$ and $c$ lie, will engage the sides of the teeth 21 indicated at $a'$ in Figure 8. Under the assumption already made, the surface $a'$ of the teeth 21 must be modified as to pressure angle to reproduce the desired involute along the paths $a$ and $c$. The involute along the path $a$ was said to be minus involute or increased pressure angle, and this surface is acted upon by the surfaces $a'$ of the left-hand end cutter 20. In order to correct the minus involute or plus pressure angle condition along the path $a$, the side $a'$ of the teeth 21 of the left-hand cutter 20 will therefore be modified as to involute or pressure angle by providing a plus involute thereon or by reducing the pressure angle thereof.

This condition is illustrated diagrammatically in Figure 9, which may be considered as an end view of a pair of teeth 21 of the left-hand cutter 20 taken normal to their length, as indicated by the line 9—9 in Figure 8. In this figure I have indicated in dotted lines 31 the outline of the teeth 21, which are unmodified as to involute or pressure angle. In full lines 32 I have indicated the necessary modification as to involute or pressure angle. As stated above, the side of the tooth a' is modified so as to have plus involute or reduced pressure angle, a condition which is well illustrated in Figure 9. From the foregoing consideration, it will be appreciated that the opposite modification is made to the side of the tooth 21 opposite to the side a', namely the modified profile as indicated in full line is of reduced involute or increased pressure angle.

As stated above, the conditions are the same at diagonally opposite corners of the gear tooth 30 so that the surfaces a" of the teeth 21 of the right-hand cutter 20 will be modified as to involute or pressure angle the same as the surface a' of the teeth 21 of the left-hand cutter 20. In other words, the cutter tooth surface a" is likewise formed to have a plus involute, or one which is high at the top, giving rise to a reduced pressure angle.

The foregoing specific example has been given in detail to enable those skilled in the art to practice the invention without further experimentation. It may be stated generally that where the band of contact on a gear tooth inclines upwardly and to the right, the right-hand end surface of the gear tooth if crowned, will have an involute which is high at the top or plus, giving rise to reduced pressure angle, and that the surface of the cutter tooth which crowns the said right-hand end surface of the gear tooth will accordingly be modified as to involute or pressure angle so as to have an involute which is low at the top or minus involute, giving rise to a plus pressure angle condition. This modified cutter tooth will provide a like modification as to involute or pressure angle on the corresponding crowned surface of the gear tooth so that, if the amount of involute or pressure angle variation is correct, the involute of the crowned gear tooth 30, as measured along any of the paths a, b, c, d and e, is a proper involute.

I have previously referred to a condition of the end cutters 20 as off-lead with respect to the surfaces of the gear tooth 30. This condition is well illustrated in Figure 8 in which it will be observed that in the developed view the surfaces of the gear teeth 30 are effectively parallel to the surfaces of the teeth of the center cutter 11, whereas the surfaces of the teeth 21 of the end cutters 20 are inclined with respect to the surfaces of the teeth 30. It is this off-lead condition or inclination of tooth surface which results in the crowning operation, and the crowning as stated above may be effected by a simple translation of the gear G, or may be effected by a translation combined with timed variation in the inclination of the gear and composite cutter.

I have illustrated the teeth of the cutter as being helical, and it will be understood that a modification of lead of the surfaces of the teeth 21 results in some change in pressure angle, but independent of this known effect I have found it necessary to impose different pressure angles on these tooth surfaces than those which inherently result from a mere change of lead.

As seen in Figure 1, the end-cutting portions 20, as used on crossed axes, may be on a somewhat larger diameter than the central cutter 11, and in addition the teeth 21, may, if desired, be beveled. I have illustrated the teeth as beveled, but this condition is not necessary.

There are two considerations to be borne in mind when selecting the end-cutting tools 20. If the gear being crowned is reciprocated axially relative to the cutter until the ends of its teeth come into cutting engagement with the cutter 20, it would be apparent that the cutting conditions resulting are substantially spaced from the center of crossed axes. In other words, in order to bring the gear into mesh with the end cutter by reciprocating it relative to the cutter in the axial direction of the gear, it is necessary for the end cutter to be of larger diameter than the center cutter. Cutting under these circumstances at a point substantially spaced from the center of crossed axes introduces certain changes which may be compensated for by suitable changes in pressure angle, etc.

It is possible, however, to provide a relative translation between the tool and gear, such that the center of crossed axes shifts relative to both the tool and cutter. Thus for example, if the gear is reciprocated in a plane parallel to the axis of the cutter but in a direction transverse to both the axis of the cutter and the axis of the gear, it will be possible to provide end-cutting between end cutters 20 and the ends of the gear teeth adjacent or substantially adjacent the center of crossed axes.

Figure 5:
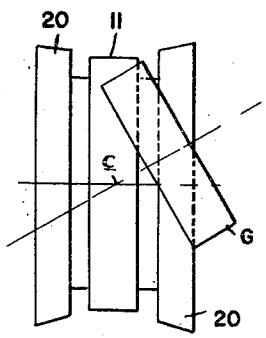
Figure 5 is a diagrammatic illustration showing the relationship between gear and cutter under one condition.

I have illustrated these two conditions in Figures 5 and 6. In Figures 5 the center of crossed axes is indicated at C and the gear G is in meshing engagement with the right-hand cutter 20. As will be evident, meshing engagement between the gear G and the right-hand cutter 20 is only possible because the cutter 20 is larger in diameter than the central cutter 11.

It will be appreciated that conditions in this diagram are exaggerated for purposes of emphasizing the conditions encountered.

In Figure 6 I have illustrated the axes of the gear G and the cutter assembly as crossing at the point c. As shown in this figure, relative translation between the cutter and gear has been in a direction such as to shift the center of crossed axes over so that it is adjacent the cutting zone between end cutter 20 and the gear G. Under these circumstances it is of course unnecessary to form the end cutter 20 on larger diameter, and these end cutters will differ from the center cutter primarily in having tapered teeth, thus presenting tooth sides of different lead. The appropriate modification of pressure angle will of course be applied.

Figure 2:
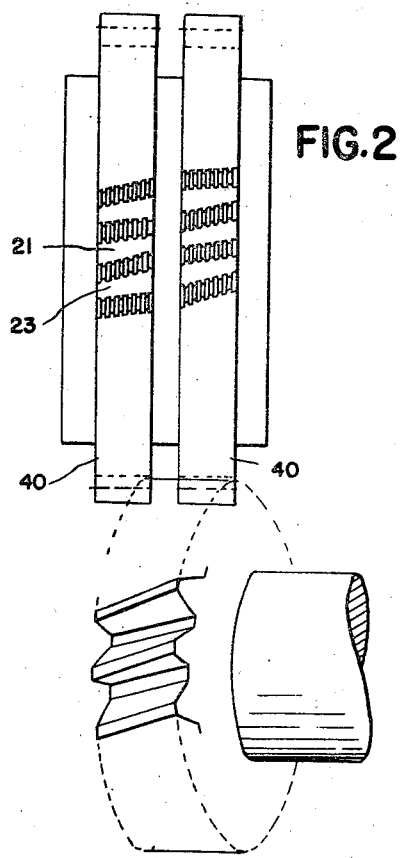
Figure 2 is an elevation of a different embodiment of my cutter.

Under certain circumstances, particularly where ultimate accuracy of high degree is not necessary, the central cutting portion 11 may be omitted and a cutter formed as illustrated in Figure 2. In this figure I employ two cutters 40, each of which are in all respects similar to the cutter 20 shown in Figure 1. The teeth of the cutters 40 are tapered inwardly toward the center of the assembly, and preferably opposite sides of the same teeth will have different pressure angles when used on crossed axes.

Figure 3:
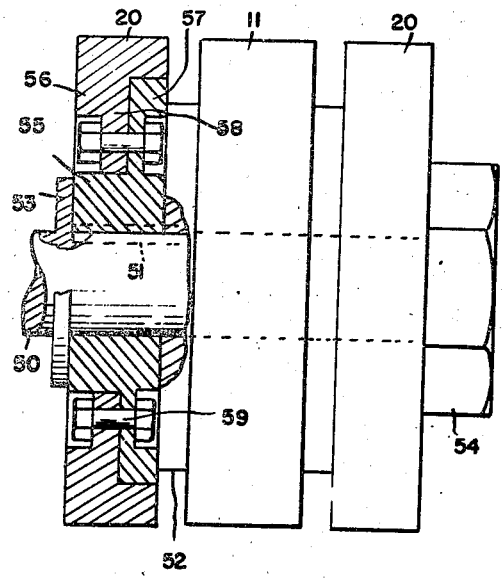
Figure 3 is a fragmentary section of a cutter of the type disclosed in Figure 1, illustrating the adjusting means.
Figure 4:
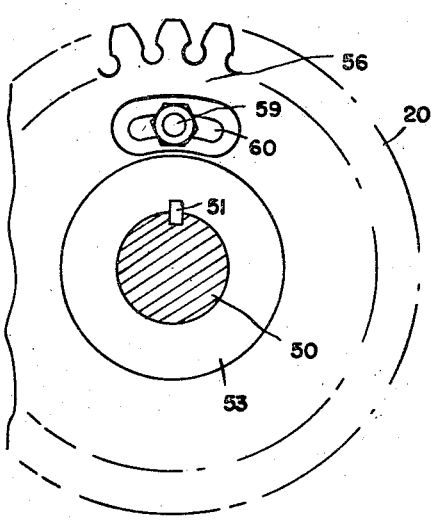
Figure 4 is a fragmentary end view of the construction shown in Figure 3.

In order to provide for resharpening of the cutters and proper adjustment thereafter, it is desirable that the cutters be relatively adjustable both axially and circumferentially. In Figure 3 I have illustrated an arrangement which provides the necessary adjustment.

In Figure 3 I have illustrated an assembly of the cutting tools on the spindle to provide a composite tool in which the end cutters are adjustable both axially and circumferentially relative to the center cutter. In this modification a shaft 50 is provided with a key 51 on which the cutters are slidably mounted, suitable keyways being provided for this purpose. In order to provide the necessary and desired spacing between the central cutter 11 and end cutter 20, I provide spacing members 52 which may be of the requisite thickness. It will be understood that the cutter assembly is clamped on the shaft 50 between a shaft abutment indicated at 53 and a suitable locking nut 54 on the shaft. In order to provide the circumferential adjustment referred to, the end cutter 20 may have a body portion 55 and an annular tooth portion 56. The body portion 55 is provided with a laterally offset radially extending shoulder 57 and the tooth portion 56 is provided with a radially inwardly extending shoulder 58. The parts are secured together by a bolt 59, the head and the nut of which are suitably recessed. One of the parts 57 or 58 is provided with an arcuately elongated slot 60 which permits the necessary circumferential adjustment.

It has been found that gears finished with cutters as disclosed herein have substantially uniform involute curvature across their width of tooth, with the result that the band of contact with a mating gear is more nearly in the line of rotation with the gear parts. As previously stated, the present cutter can be used with either parallel axes or crossed axes. They can be used on spur or helical gears. They can be used with parallel straight line reciprocation or with tilting of the work, or with a combination of the two, or with curvilinear reciprocation, as above mentioned.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A cutter for crowning gear teeth which comprises a gear-like center-cutting portion and a gear-like end-cutting portion axially disposed to said center-cutting portion, said portions having teeth adapted to mesh with the teeth of a gear being finished, said center-cutting portion having uniform teeth, both sides of which have the same lead, the teeth of said end-cutting portion being non-uniform, opposite sides of which have different leads, and being additionally modified as to pressure angle, so as to produce a crowned end on the gear teeth adapted to have uniform bearing substantially in the line of roll.

2. A cutter for crowning gear teeth which comprises a gear-like center-cutting portion and a gear-like end-cutting portion axially disposed to said center-cutting portion, said portions having teeth adapted to mesh with the teeth of a gear being finished, the teeth of said center-cutting portion having uniform teeth, both sides of which have the same lead and pressure angle, the teeth of said end-cutting portion having opposite sides of greater and less lead, and greater and less pressure angle than the teeth of said center-cutting portion.

3. A cutter for crowning gear teeth which comprises a gear-like center-cutting portion and oppositely, axially disposed gear-like end-cutting portions, said portions having teeth adapted to mesh with the teeth of a gear being finished, the teeth of said center-cutting portion having uniform teeth both sides of which have the same lead, the teeth of said end-cutting portions being non-uniform, opposite sides of which have different leads, and being additionally modified as to pressure angle, so as to produce a crowned end on the gear teeth adapted to have uniform bearing substantially in the line of roll.

4. A gear-like cutting tool having teeth provided with cutting surfaces on both sides, said teeth being tapered from end to end to provide tooth surfaces having different leads, said teeth being further modified as to pressure angle, the arrangement being such that one side of said teeth have a greater pressure angle than the opposite side.

5. A gear finishing tool comprising a pair of coaxial gear-like cutting portions having aligned teeth tapered toward the center of said tool, the teeth of each portion being modified as to pressure angle such that one side of the teeth of each portion has a greater pressure angle than the opposite side of the teeth of said portion.

6. A gear finishing tool comprising a pair of coaxial gear-like cutting portions having aligned teeth tapered toward the center of said tool, the teeth of each portion being modified as to pressure angle such that one side of the teeth of each portion has a greater pressure angle than the opposite side of the teeth of said portion, the pressure angle modification at the opposite end of aligned teeth of said portion being opposite, so that the pressure angle modification of a tooth of one surface of one portion will be like the pressure angle modification of the tooth surface diagonally opposite thereto on the aligned tooth.

7. A cutter for crowning gear teeth which comprises a gear-like center-cutting portion and oppositely, axially disposed gear-like end-cutting portions, said portions having teeth adapted to mesh with the teeth of a gear being finished, the teeth of said center-cutting portion having uniform teeth both sides of which have the same lead, the teeth of said end-cutting portions being non-uniform, opposite sides of which have different leads, respectively greater and less than the lead of the teeth of said center cutting portion, and being additionally modified as to pressure angle, so as to produce a crowned end on the gear teeth adapted to have uniform bearing substantially in the line of roll.

ROBERT S. DRUMMOND.